Figure 1:
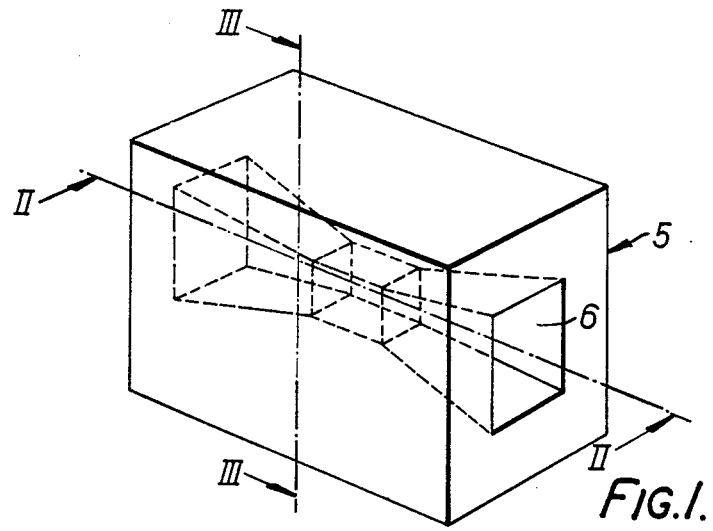

United States Patent
Roberts

[11] 3,958,861
[45] May 25, 1976

[54] DIELECTRIC OPTICAL WAVEGUIDES

[75] Inventor: Frederic Francis Roberts, London, England

[73] Assignee: The Post Office, London, England

[22] Filed: Nov. 26, 1974

[21] Appl. No.: 527,436

[30] Foreign Application Priority Data
Dec. 13, 1973 United Kingdom............... 57812/73

[52] U.S. Cl. ............................. 350/96 C; 350/96 B
[51] Int. Cl.² ........................................... G02B 5/14
[58] Field of Search ....................... 350/96 B, 96 C

[56] References Cited
UNITED STATES PATENTS
3,846,010  11/1974  Love et al. ................... 350/96 B X
3,864,018  2/1975  Miller ............................ 350/96 C FOREIGN PATENTS OR APPLICATIONS
1,044,316  11/1953  France ............................ 174/117

OTHER PUBLICATIONS
Parfitt et al., "Interconnections and Switches for Glassfibre Optical Links," *Electronic Components* Jan. 28, 1972, pp. 69, 73–75.

Primary Examiner—James B. Mullins
Attorney, Agent, or Firm—Hall & Houghton

[57] ABSTRACT

A connector for joining together a pair of optical strands each of which includes a plurality of dielectric optical waveguides. The connector comprises a block through which extends a polygonal cross-section guideway into which the strands are pushed. In the completed joint, each waveguide of a strand is located in a respective corner of the polygonal cross-section of the guideway and is optically coupled with a waveguide of the other strand. Preferably, the guideway tapers outwardly towards the end faces of the block.

7 Claims, 5 Drawing Figures

DIELECTRIC OPTICAL WAVEGUIDES

This invention relates to conectors for connecting end portions of a pair of optical strands made up of a plurality of optical fibres (dielectric optical waveguides).

The term "optical" and "light" as herein used is intended to refer to those regions of the electro-magnetic spectrum more usually designated as the infra-red, visible, and ultra-violet.

The connectors are especially for use with a strand as described in our co-pending British patent application No. 43492/72. The strand is of a type having a plurality of optical fibres circumjacent a central resiliently deformable filament of multi-lobed section, the optical fibres being disposed along flutes between adjacent lobes and held in place by a plastics sheath.

It is well known that optical fibres, which function as dielectric optical waveguides may be made to have very low optical attenuation, (eg. 20dB/KM or less at a wavelength of about 0.9 microns) and that such fibres may be used for telecommunications purposes by incorporating them in cables and by connecting them between suitable signal sending and signal receiving apparatus. In forming a suitable optical telecommunications link it will of course be necessary to connect optical fibres together at junctions between different lengths of cable. Prior art techniques for making such joints frequently involve the accurate manual positioning of fibres to be joined, fusing of the fibres, or elaborate clamping devices. These techniques are completely unsuitable for use under field conditions and it is desirable to provide a connector which is cheap to produce, easy to use and capable of the simultaneous coupling of a plurality of dielectric optical waveguides.

It is an object of the present invention to provide a connector which is of simple construction and enables a plurality of individual dielectric optical waveguides to be coupled together simultaneously.

According to the present invention, an optical strand connector comprises a block having a guideway of polygonal cross-section, which extends through the block between two opposite end faces thereof.

Preferably, the guideway tapers outwardly towards each of the said end faces.

According to a second aspect of the present invention there is provided a joint between the ends of a pair of optical strands each of which includes a plurality of dielectric optical waveguides disposed circumjacent a resiliently deformable core, said joint comprising a block having a guideway of polygonal cross-section, which extends through the block between two opposite end faces thereof, each of the strands extending into the guideway from a respective end thereof and being positively located against rotational displacement in the guideway, the ends of the optical strands within the block being so located that each dielectric optical waveguide of one of the strands is optically coupled with a respective dielectric optical waveguide of the other strand.

Figure 2:
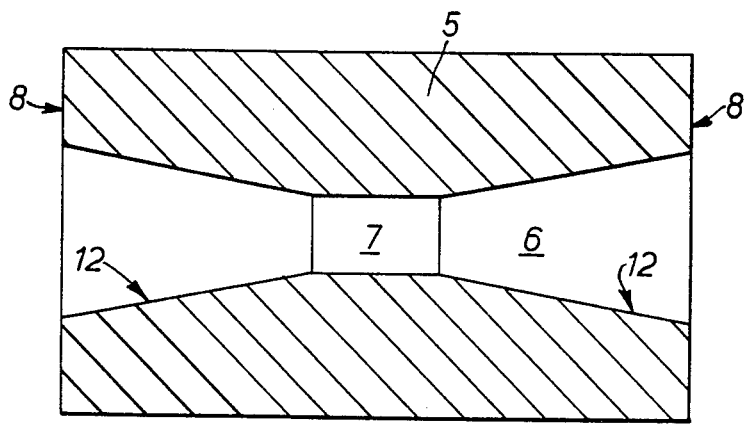
Figure 3:
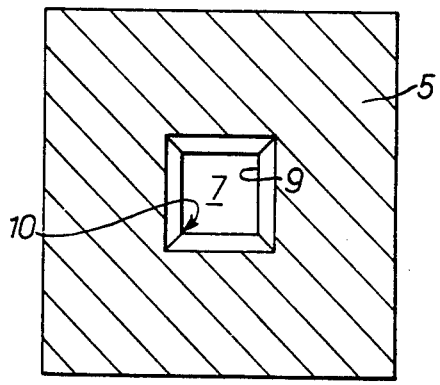
Figure 4:
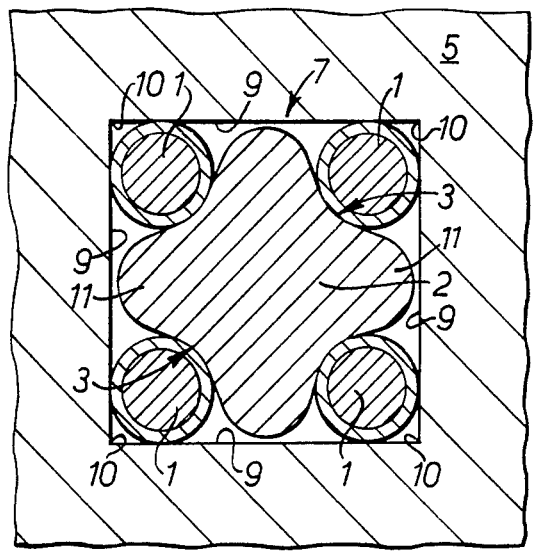
Figure 5:
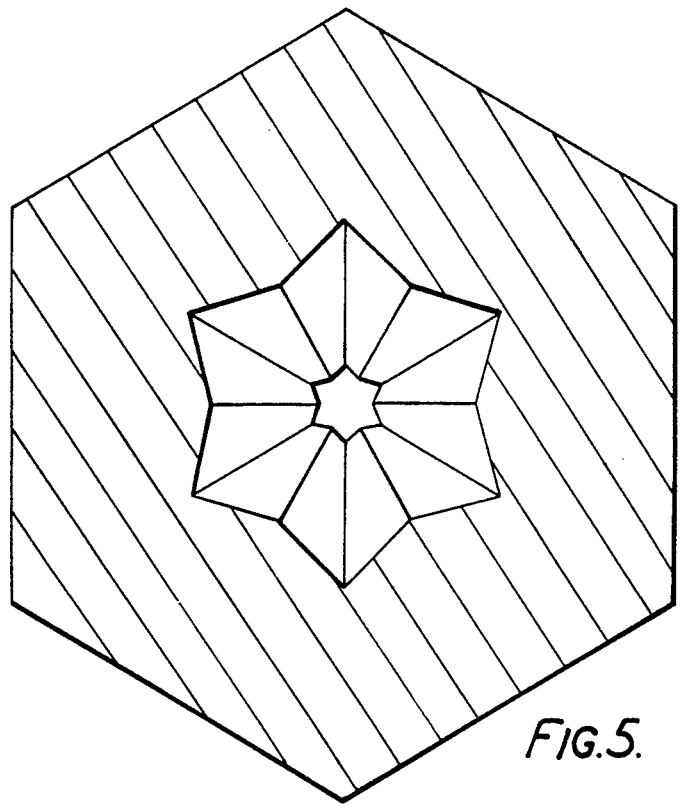

Two embodiments of the invention will now be described by way of example, with reference to the accompanying diagrammatic drawings in which:

FIG. 1 is a perspective view of a connector for joining together optical strands having four dielectric optical waveguides circumjacent a central plastics filament, FIG. 2 is a sectional view on a vertical plane containing the line II—II of FIG. 1, FIG. 3 is a sectional view on a vertical plane containing the line III—III of FIG. 1, FIG. 4 is a sectional view similar to FIG. 3 but with a strand located within the connector, FIG. 5 is a sectional view similar to FIG. 4, but showing a connector for use with strands having six dielectric optical waveguides circumjacent a central plastics filament.

The connector shown in perspective view in FIG. 1 is suitable for connecting optical strands as described in our co-pending British patent application No. 43492/72 and as shown in cross section in FIG. 4. Such a strand is made up of four optical fibres (dielectric optical waveguides) 1 which are arrayed circumjacent a central resiliently deformable core comprising a fluted plastics filament 2 with each of the fibres 1 lying in a flute 3. The fibres 1 are normally held in place by a plastics sheath but this has been removed from the portion of the strand shown in FIG. 4, as described below. Typically, the outer diameter of a strand, including the plastics sheath, is within the range 300 microns to 1 millimetre and the outer diameter of a fibre 1 is in the region of 100 microns.

The connector is in the form of a rigid plastics cuboid block 5 through any suitable shaped block could be utilised. A square cross-sectioned guideway 6 extends throughout the length of the connector as shown in FIG. 2. The cross-sectional area of the guideway is uniform along an intermediate portion 7 and increases gradually from the ends of portion 7 to the faces 8 of the connector to form outwardly tapered portions 12. A uniform taper may be utilised as shown in FIG. 2 : alternatively, the angle of taper may be increased gradually towards the end of the connector (not shown). Portion 7 of the guideway is bounded by optically flat walls 9.

End portions of a pair of strands to be joined are stripped of any sheathing and the strands are pushed longitudinally from opposite ends of the connector into the guideway so that the strands intersect the planes of the faces 8 of the block. The tapered portions 12 of the guideway 6 facilitate insertion of the strands.

As the end portion of a strand progresses along a tapered portion 12 of the square-sectioned guideway 6, each of the dielectric optical waveguides in the strand becomes located in a respective corner formed at the intersection of adjacent sides 13 of the tapered portion and this location is maintained when the strand enters the intermediate portion 7 of the guideway (FIG. 4). The cross-sectional area of portion 7 is dimensioned to be slightly smaller than the minimum area which would be occupied by a square bounding the end of the unstressed strand so that an interference fit exists between the walls of the portion 7 and the adjacent surface portions of the optical fibres 1. Thus with the strand fully inserted into portion 7 of the guideway 6, a transverse force is produced from each of the optical fibres 1 by contact with the walls 9. The force on the fibres is transmitted through the fibres so that a uniform inwardly radially extending compressional force is experienced by the central plastics filament 2. The filament deforms resiliently under the action of thus force which acts to maintain each of the dielectric optical fibres 1 in a clamped position adjacent a corresponding corner 10 of the portion 7, and this positively locates the strand against rotational displacement in the guideway.

As shown in FIG. 4 the cross-section of the intermediate portion 7 of the guideway is dimensioned so that the tips 11 of the central plastics filament 2 extend to just short of the walls 9 when the strand is located within the guideway so as to ensure that the component of forces produced by the deformed filament 2 and acting to bias each fibre 1 into a corner 10 is the same for all fibres in the strand.

The end portions of each of the pair of strands to be connected are located in the above manner in respective tapered portions 12 of guideway 6 and are brought together in butting relationship within portion 7 of the guideway. By virtue of walls 9 being optically flat, abutting pairs of optical fibres in a pair of strands to be connected are automatically aligned during insertion thereof into the portion 7 of the guideway. When the pair of strands are correctly aligned to each optical fibre in one strand is optically coupled to a respective fibre in the other strand, so that light may be transmitted from one fibre to the other fibre with minimal loss.

The interference fit between the fibres and the walls of the portion 7 of the guideway produces sufficient resistance to withdrawal of the strands from the connector for the connector to provide a temporary mechanical connection. A permanent mechanical connection may be obtained by injecting a suitable sealing material into each tapered portion 12 to surround the part of the strand disposed within the tapered portion. Alternatively, adhesive material may be applied so as to envelope a portion of the strand disposed just exterior to each end of the connector. The optical efficiency of the connector may be enhanced by using a refractive index matching fluid between the ends of the two optical strands to be joined.

FIG. 5 shows a cross-sectional view through a tapered portion of the guideway of a connector which is generally similar to that shown in FIGS. 1 to 3 but which is suitable for joining an optical strand (not shown) made up of six dielectric optical waveguides arrayed in the flutes of a fluted central deformable plastics filament.

I claim:

1. A joint between the ends of a pair of optical cables each of which includes an elastically-deformable core and a plurality of dielectric optical waveguides disposed circumjacent the core, said joint comprising a monolithic block having a guideway of polygonal cross-section, which extends through the block between two opposite end faces thereof and into which each of the cables extends from a respective end of the guideway, a portion at least of the core within the guideway being compressed transversely whereby each dielectric optical waveguide is urged by the core into a respective corner of the polygonal cross-section of the guideway and into engagement along two lines with the block, thereby positively locating the cable against movement within the guideway in a plane lying transversely to the cable axis, the ends of the optical cables within the block being so located that each dielectric optical waveguide of one of the cables is optically coupled with a respective dielectric optical waveguide of the other cable.

2. A joint as claimed in claim 1, in which the guideway tapers outwardly towards each of the said end faces.

3. A joint as claimed in claim 2, in which the guideway has an intermediate portion of constant cross-section between the outwardly-tapering portions.

4. A joint as claimed in claim 3, in which the walls of the intermediate portion are optically-flat.

5. A joint as claimed in claim 3, in which the guideway tapers uniformly between the intermediate portion and each of the said end faces.

6. A joint as claimed in claim 1, in which the strands are sealed to the guideway.

7. A joint as claimed in claim 1, in which the strands are secured to the said end faces of the connector by an adhesive.

* * * * *